Dec. 10, 1929. E. S. GOODSPEED 1,738,573
ARC WELDING
Filed July 22, 1920 5 Sheets-Sheet 1

Inventor
Elvin S. Goodspeed
By Attorneys
Blackmore, Spencer & Flint

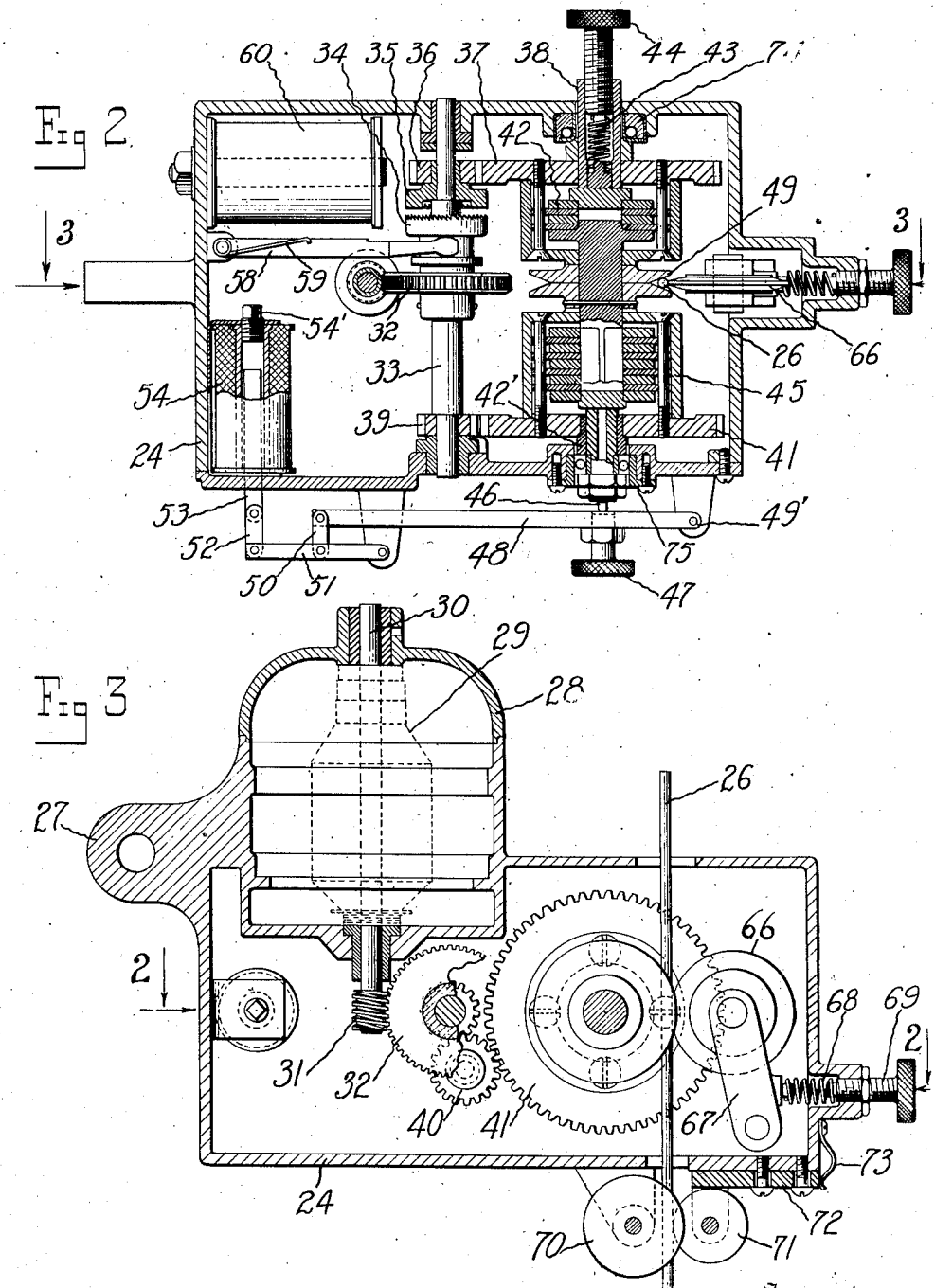

Dec. 10, 1929.  E. S. GOODSPEED  1,738,573
ARC WELDING
Filed July 22, 1920   5 Sheets-Sheet 3
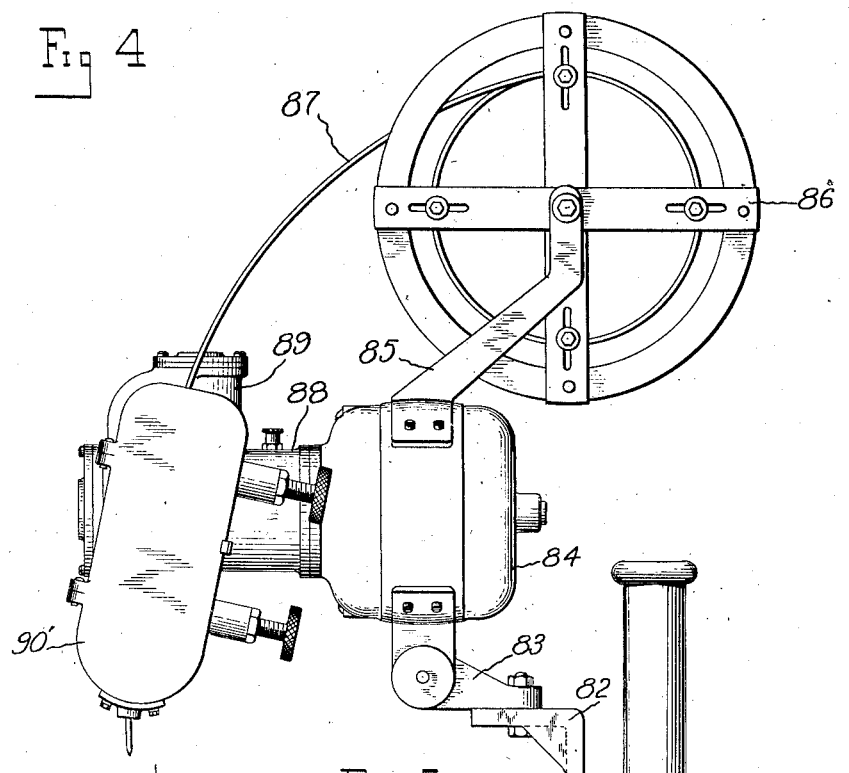
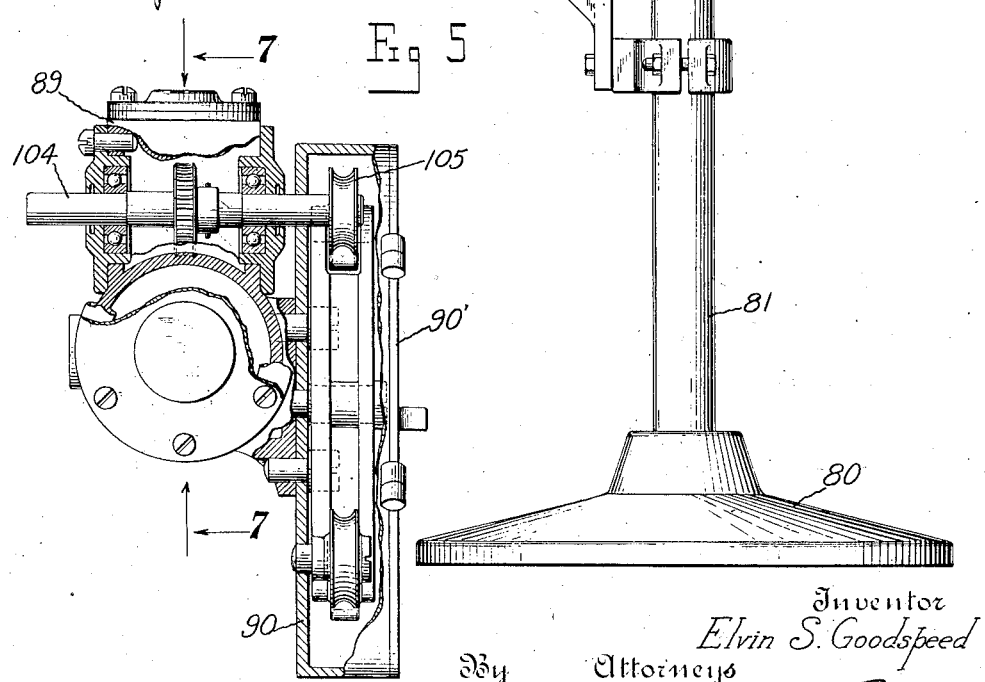
Inventor
Elvin S. Goodspeed
By Attorneys
Blackmore, Spencer & Flint

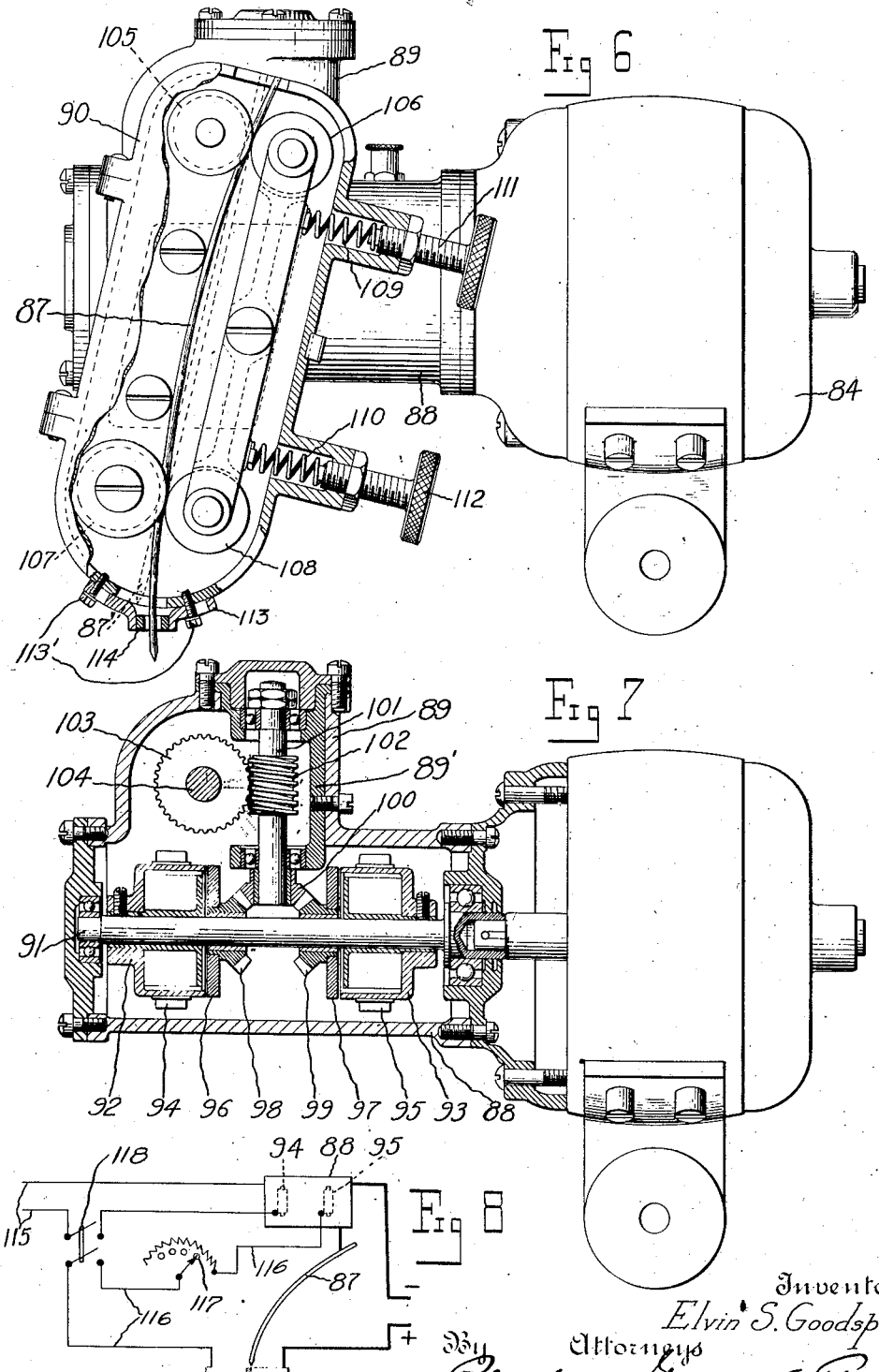

Dec. 10, 1929.  E. S. GOODSPEED  1,738,573
ARC WELDING
Filed July 22, 1920     5 Sheets-Sheet 5
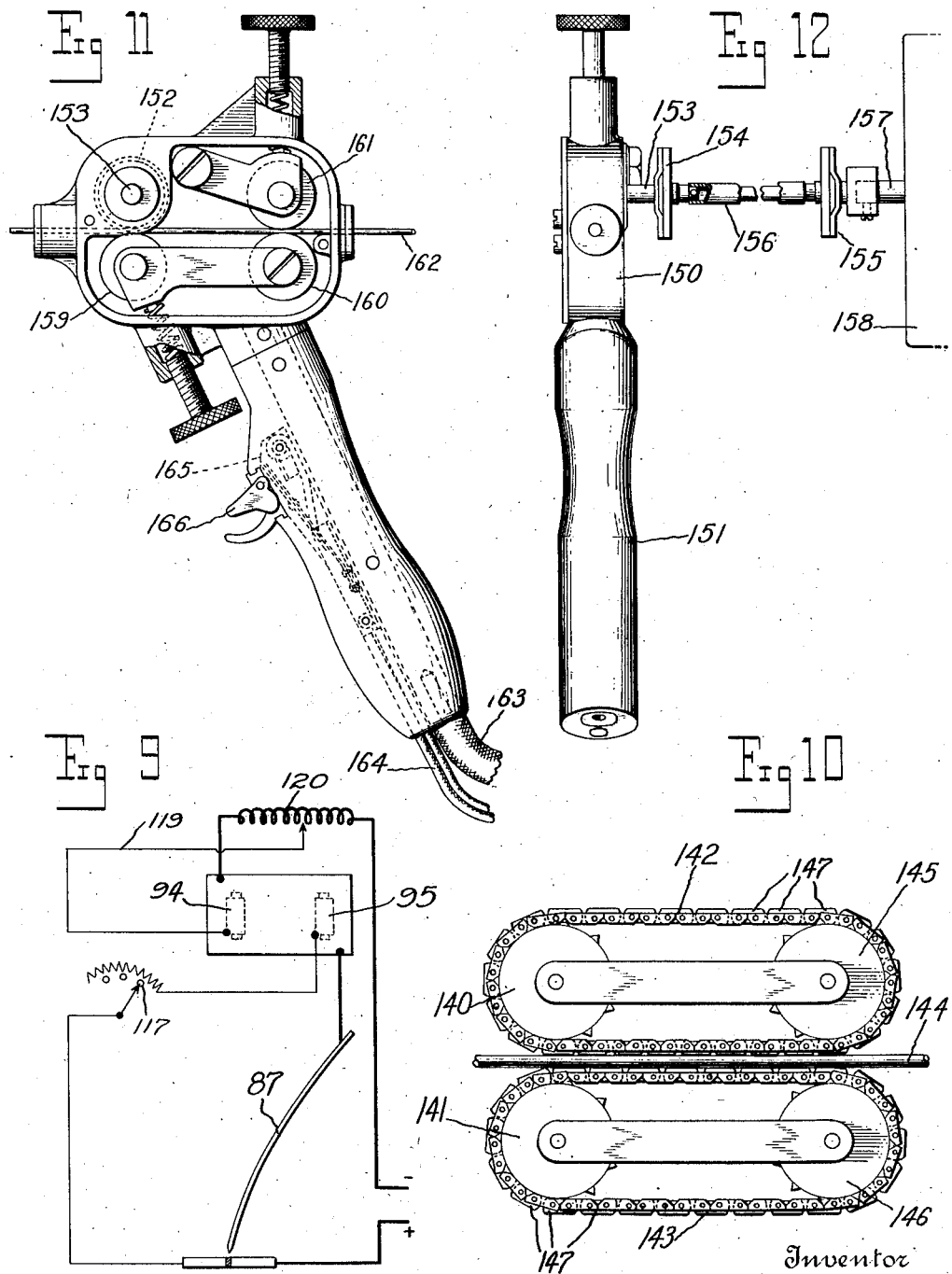

Patented Dec. 10, 1929

1,738,573

UNITED STATES PATENT OFFICE

ELVIN S. GOODSPEED, OF DETROIT, MICHIGAN, ASSIGNOR TO GENERAL MOTORS CORPORATION, OF DETROIT, MICHIGAN, A CORPORATION OF DELAWARE

ARC WELDING

Application filed July 22, 1920. Serial No. 398,198.

The invention relates to methods and apparatus designed to utilize variations in electrical conditions, such as resistance and voltage, to produce operation of mechanical controlling or feeding device. One of the uses to which the invention is applicable and in connection with which it is believed to have especial utility, is for the control of feeding mechanism for electrodes of apparatus in which an electric arc is employed for heating or welding purposes, and more particularly apparatus of the type in which a metallic electrode is employed, although it will be clear that in its broader aspects the invention is not limited to use in such apparatus.

In arc welding or heating apparatus, and especially where a metallic electrode is employed, the electrode wastes away or fuses as the work proceeds, and it is necessary to provide for the feeding of the electrode toward the work, either by hand or by appropriate automatic mechanism. Means have been devised in which the electrode is supplied at a constant rate, but inasmuch as the fusion or dissipation of the electrode is affected by several variable factors a constant feeding movement of the electrode has not proved practicable. Efforts have also been made to provide for automatic feed in response to varying conditions in the arc itself, but in general the difficulties of automatic feeding have been such that it has been the usual practice to secure the electrode in a hand operated support or holder in order to place the feeding of the electrode under the direct control of the operator. Work of this character however is tedious and requires a high degree of skill and moreover is likely to prove injurious to the eyes of the workmen.

The primary object of my invention is to provide means whereby the movement of an element, such as an electrode holder or other device, may be rendered responsive to varying electric conditions such as those occurring in an electric arc.

A further object of my invention is to provide automatic means for controlling the movement of an electric or like movable element whereby the necessity for close attention of the operator to the work may be eliminated and a greatly increased rate of production may be attained, thereby materially lessening the expense of the product. A further object is to provide an automatic feeding device in which the rate at which electrode material is supplied shall be dependent upon the conditions existing within the arc itself, and whereby a uniform length of arc may be maintained. A further object is to provide a feeding device which shall be capable of retracting an electrode in proportion with the shortening of the arc, thereby enabling welding operations to be performed upon the work of uneven or irregular contour. Another object is to provide a feeding device combining an automatic control of the electrode with a means enabling the operator to give at will any desired adjustment or position to the electrode holder. With the above and other objects in view as will appear more fully from the following description my invention comprises the features of novelty hereinafter set forth and recited in the appended claims.

In the accompanying drawings illustrating some embodiments of my invention:

Fig. 2 is a sectional view taken on line 2—2 of Fig. 3, showing in detail one form of electrode feeding device.

Fig. 3 is a sectional view on line 3—3 of Fig. 2.

Fig. 4 is a side elevation of a second embodiment of my invention.

Fig. 5 is an end elevation, partly in section, of the feeding mechanism of Fig. 4.

Fig. 6 is a side elevation on a larger scale and partly in section showing the feeding mechanism of Fig. 4.

Fig. 7 is a sectional elevation on line 7—7 of Fig. 5.

Fig. 8 is a diagrammatic view showing electrical connections for the clutches of Fig. 7.

Fig. 9 is a similar view showing a modified form of wiring diagram.

Fig. 10 is a view showing a flexible electrode contacting device which may be employed in any of the forms of feed mechanisms shown.

Fig. 11 is a plan and Fig. 12 a side elevation, partly in section, of a hand-operated holder connected to an automatic feed device so as to combine to some extent the advantages of both hand and automatic control.

Figure 1:
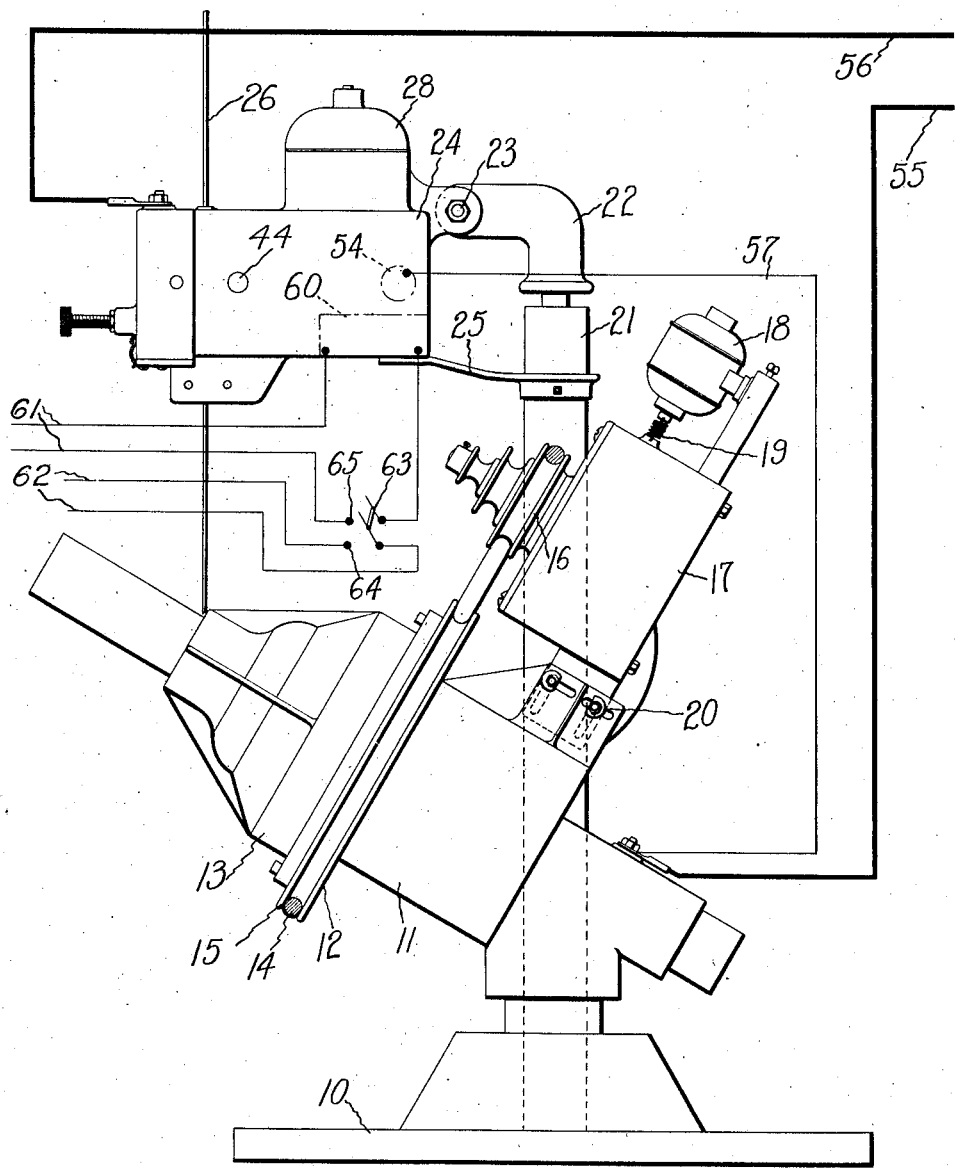
Fig. 1 is a view in elevation of an electric welding apparatus adapted to employ the principles of my invention.

Referring to the drawings 10 indicates a pedestal upon which is supported a frame 11, adapted to carry a rotating table 12 upon which a work piece 13 may be mounted. The work piece may be of any desired character, but is illustrated in this case as being an axle housing of a common form. The work table 12 may be rotated at the desired speed by means of a belt 14 operating upon the pulley 15 and driven by the stepped pulley 16, the latter being rotated by any suitable form of gearing which may be mounted within the housing 17, and driven by motor 18 through flexible connection 19. Any suitable means of adjusting the support of the motor and gearing may be provided at 20. It will be understood, however, that the particular means for causing the work to pass under the electrode forms no necessary part of my invention and that any desired or suitable means of causing the relative movement of the work and the electrode holding device may be employed.

The standard 21 which may be carried by the pedestal 10 is adapted to support a swinging arm 22 to which may be pivotally connected, as at 23, the housing 24 which with its related parts constitutes the welding head. A bracket 25 may be provided to support the welding head and permit its movement about the pivot 23 and around the axis of the standard 21. The welding head will, of course, be so supported that the metallic electrode 26 may be properly positioned above the point on the work 13 where the welding operation is to be performed. The housing of the welding head includes the lug 27 for attachment to the pivot 23, and an extension 28 within which may be supported any desired type of constant speed motor, as the electric motor 29. The shaft 30 of this motor carries on one end the worm 31 engaging with worm wheel 32 supported by the shaft 33 suitably mounted in bearings in the walls of housing 24. Motion is communicated from shaft 33 through clutch members 34, 35, to gear 36 in mesh with gear 37 loosely mounted upon shaft 38. Motion is also communicated from shaft 33 through gears 39, 40, to gear 41 suitably supported on bearings 42' thereby driving gear 41 in a direction opposite to the direction of rotation of gear 37. The gear 37 is adapted to drive shaft 38 by means of the friction clutch 42 which may be subjected to the desired pressure by means of spring 43 adjustable by screw 44. The gear 41 is also adapted to drive shaft 38 by means of friction clutch 45, which latter is adjusted by means of rod 46 engaging with the adjusting screw 47 carried by the lever 48. Mounted upon the shaft 38 and secured thereto is the grooved feed wheel 49 adapted to engage with a body of electrode material, shown at 26. This material is shown in the form of a cylindrical rod or bar, but it will be understood that it may take the form of a strip or wire as desired, and that it may be supplied in quantity from a reel or roll in order that the inconvenience and waste due to the use of short lengths may be avoided. The lever 48 is pivotally attached at one end, as at 49', to a part of the housing 24; the other end is connected in any suitable manner, but preferably by the compound linkage comprising link 50, lever 51 and link 52, to the core 53 of a solenoid 54. This solenoid may be of usual type but is shown as comprising an adjustable plug or stop 54' which serves to limit the movement of core 53 and to increase the magnetic attraction as the core approaches its limit of movement. The clutches 42 and 45 may be of any desired construction of friction clutch but I prefer clutches as shown of the multiple disk type, because of the uniform torque transmitted as well as the capability for accurate adjustment.

By reference to the structure thus far described it will be seen that the clutch 42 will tend to drive the feed wheel 49 at a constant rate in one direction which direction is taken to be that which would retract the electrode from the work. The clutch 45 on the other hand will tend to drive the feed wheel 49 in the opposite direction, that is, in the direction to feed the electrode 26 toward the work. The resultant effect upon the direction of travel of the electrode will therefore depend upon the relative driving torque exerted by the said clutches. The effect of clutch 42 may be determined by the adjustment of screw 44 as above pointed out. The effect of clutch 45 is determined by the position of lever 48 which is varied by the magnetic attraction due to the current flowing in the winding of solenoid 54.

By reference to Fig. 1, it will be seen that one terminal 55 of the main line by which the welding current is supplied is grounded upon the work-supporting frame 11 and the other terminal 56 is connected to the welding head 24, these parts of course being suitably insulated from each other in order that the welding current may be caused to pass between the work and the electrode 26. The wire of solenoid 54 is grounded at one end upon the welding head 24 and is connected at the other end by a conductor 57 to the frame 11 or to some other suitable point of communication with the main line terminal 55. It will be seen, therefore, that the solenoid 54 is arranged in shunt with the arc and hence as the resistance of the arc increases or as the voltage builds up therein a greater quantity of current will flow through the solenoid 54 and thereby the clutch 45 will be operated to cause the feeding of the electrode 26 in the direction of the work.

The clutch member 34 is arranged to be thrown into engagement with the co-operating clutch member 35 by a lever 58 which may be actuated in one direction by a spring 59 and in the other by magnetic attraction of the electro-magnet 60. This electro-magnet 60 may be arranged in any suitable circuit independent of the welding circuit as, for example, an ordinary 110-volt lighting circuit 61. The supply of current from the main line 55, 56, will be regulated by the use of any of the electric welding sets or control panels now on the market preferably by one of the type designed to supply a current of approximately constant amperage. In the wiring of the sets used in arc welding it is customary to control the main switches by means of a control circuit extending to some point adjacent to the position of the operator. A control circuit of this kind is indicated at 62. A double switch 63 mounted in any suitable position convenient for the operator is adapted to close both of the circuits 61, 62. This switch is preferably so constructed that the circuit 62 will be broken at contact 64 slightly before the breaking of the circuit 61 at contact 65. The result of this arrangement is that the clutch 42 is permitted to operate for a very short time after the breaking of the main welding circuit thereby causing the electrode 26 to be withdrawn slightly from the work and thereby preventing "freezing" to the work.

The feeding of the electrode is facilitated by the use of a pressure roller 66 which may be supported upon a pivoted arm 67 yieldingly forced against the electrode by spring 68 adjustable by means of screw 69. Additional guide rollers 70, 71 may be provided, the latter of which is shown as being supported upon a slidable plate 72 under the influence of spring 73. The shaft 38 may be supported in suitable anti-friction bearings 74, 75, in order to avoid external resistances tending to affect its sensitiveness to control by the devices above described.

In the operation of this form of my invention, the motor 29 will be first started and the mechanism for causing relative movement of the work and the welding head will be set in operation, the electrode 26 being permitted to come into contact with the work. Then upon closing the double switch 63 the clutch members 34, 35, will be engaged and the welding current caused to flow through the work and the electrode. Since there is only slight resistance at the point of contact of the electrode with the work there will be a relatively small current flowing through the shunt circuit 54, 57, and the clutch member 42 will be permitted to operate to retract the electrode thus drawing the arc. As the resistance of the arc increases the current through the shunt circuit will be proportionately increased until the effect of the solenoid upon clutch 45 becomes sufficient to overcome the action of clutch 42 and cause the electrode material to be fed toward the work. By proper adjustment of the two clutches the mechanism may be made to feed the material to or from the work at such rate as to maintain an arc of substantially uniform length. Furthermore, if the arc should approach an elevated portion of the work, as a flange or other irregularity, the resultant shortening of the arc will cause the lifting of the electrode material, whereby the arc may be maintained even in the presence of considerable irregularity in the contour of the work.

In the form of the invention shown in Figs. 4 to 7 inclusive, 80 is a pedestal supporting a standard 81 to which is clamped a bracket 82. An arm 83, pivotally secured to bracket 82, serves to support pivotally the motor 84. It will be noted that this supporting means provides a wide range of adjustment as to height and angular position. Upon the motor is carried a suitable bracket 85 to support a reel 86 for the electrode material 87.

The feeding device in this instance is housed within a casing secured to the frame of the motor 84, and comprising a cylindrical portion 88, an upper section 89 and a side portion 90. Mounted in suitable bearings in the housing 88 is the shaft 91, adapted to be driven by the shaft of the motor as by a splined connection. Surrounding this shaft are the two magnetic clutches 92, 93, the windings of which are connected at one end respectively to the slip rings 94, 95, and at the other end grounded upon the clutch casings, which latter are secured to the shaft 91 to rotate therewith. The clutch disks 96 and 97, which are adapted to be influenced by the magnets in the clutch casings and thereby caused to rotate with the shaft, are rigidly connected respectively to pinions 98, 99. Both of these gears mesh with gear 100 secured to rotate with the shaft 101, journalled in the support 89' suitably mounted in the casing section 89.

It will be evident from the arrangement of parts above described that the pinions 98, 99, cannot both rotate in the same direction, and that the pinion upon whose clutch disk the greater magnetic attraction is being exerted will operate to turn the gear 100 thereby rotating the shaft 101 in one or the other direction depending upon the relative strength of current flowing in the coils of the respective clutches, or, should both clutches be momentarily of the same strength, permitting the shaft to remain at rest.

Motion imparted to the shaft 101 is transmitted through the worm 102 to the worm wheel 103 secured to the shaft 104. The latter extends through bearings in the sides of the casing and into the casing section 90 which is separate from the casing 88 but secured in fixed relation thereto. Upon the end of shaft 104 inside of casing section 90 is the feed roll 105 between which and pressure roll 106 the electrode wire or strip is caused to pass.

Additional guide rollers 107, 108, are mounted in the lower end of casing 90, and springs 109, 110, engaged by screws 111, 112, operate to force rollers 106, 108, respectively, against co-operating rollers 105, 107, the rollers 106, 108, being mounted upon pivoted arms engaged by the springs as shown in Fig. 6.

The casing section 90, which is provided with a door 90' to give convenient access thereto, is made separate from and merely attached to the exterior of the casing in which the driving mechanism and gears are located in order to prevent access of oil or the like to the feed devices and the electrode material.

In this embodiment of the invention the shaft upon which the clutches are located rotates at relatively high speed, the speed reduction devices being located between the clutch mechanism and the feed rolls. As a result irregularities in the operation of the clutches will be reduced to a degree corresponding to the speed reduction and the feed may be rendered more uniform and freer from fluctuations.

In this form of the device the clutch which operates to feed the electrode in a direction away from the work may be connected with a source of constant current as by the conductor 115, Fig. 8, whereby the action of the clutch members will remain uniform or of a predetermined value. The other clutch may be connected in shunt with the arc, in a manner similar to that already described in connection with the form of Figs. 1–3, as at 116, Fig. 8, whereby as the resistance in the arc increases, due to the increase in the distance between the electrode and the work, the magnetic strength of the clutch 95 is increased sufficiently to overcome the action of the other clutch 94 and feed the electrode toward the work. Any convenient control devices, such as rheostat 117 and switch 118, similar to switch 63, Fig. 1, may be provided in order to regulate or adjust the flow of current through the two clutches.

Another arrangement of wiring is shown in Fig. 9. In this arrangement the clutch 95 is placed, as in the form previously described, in shunt with the arc, the rheostat 117 being employed if desired, but no hand operated switch being necessary. The clutch 94 is placed in series with the arc—preferably in a circuit 119 arranged in shunt with the main line with a variable resistance 120 so that a predetermined portion of the current on the main line will flow through the magnets of the clutch. With this arrangement it will be seen that when the main switch is closed the clutches will at once become operative to feed the electrode material upwardly or downwardly as may be necessary to obtain and maintain the balance of predetermined conditions in the respective circuits. Furthermore the mechanism is rendered especially sensitive since the clutches vary inversely, that is, as the flow through clutch 95 increases due to a lengthening arc that through clutch 94 decreases due to a reduced flow in the main line, while as the flow through clutch 95 decreases that through clutch 94 increases.

It will be understood further that the arrangement of control circuits above described is also applicable to other forms of transmission or electrode driving means.

The use of a reel of electrode material is greatly facilitated if the feed devices be adapted to feed the material in a curved condition just as it comes from the reel, thus avoiding the necessity for straightening the wire or strip. It will be understood that the sensitiveness and accuracy of control of the automatic devices would be seriously affected if they were to be given sufficient strength and rigidity to straighten as well as feed the wire, and at the same time it is impracticable to employ independent positive straightening devices owing to the difficulty of synchronizing the operation of the straightening device with that of the feeding device. I have therefore so arranged the feeding device that it supplies the wire in the curved condition in which it unwinds from the reel, as shown in Figs. 4 and 6, and I believe that I am the first to propose the use of the curved electrode. In order to provide for the feeding of the curved wire or strip I mount the guiding devices in such relative positions that they lie in a curved rather than a straight line. A single pair of guides, as for example the pair formed by the upper and lower feed rolls of Fig. 6, are adapted to receive either a curved or a straight electrode. A straight electrode is shown in broken lines in said figure, whereas a curved electrode is shown in full lines. I prefer, however, to employ another guide device, including a support 113 enclosing a spool or sleeve 114 of refractory material and adjustably secured to the casing 90, as by screws 113' passing through slots in the support. The position of the support is thus rendered adjustable to accommodate it to the curvature of the wire.

It will be understood that various other transmission devices may be employed embodying the principles of my invention, and providing means whereby a plurality of sources of relatively variable driving influence may be so combined as to impart to the element to be moved the resultant of such influences, and therefore I do not wish to be limited to the forms above described.

In order to increase the efficiency of transmission of current I have devised the novel form of feed device shown in Fig. 10. In this device the feed rollers 140, 141, one at least of which will be arranged to be automatically driven as already described, instead of contacting with the electrode material, are adapted to drive traveling flexible contacting and gripping elements such as chains 142, 143, between which the electrode 144 is positioned. The chains will be supported by additional rollers 145, 146, or equivalent means. The links will be preferably so formed and connected as to permit deflection from a right line in one direction only so that the contact links 147, which may be appropriately formed to fit and grip the electrode material 144, may forcibly engage the said material and provide an extended conducting and gripping surface.

It will be seen that this form of feed device affords an increased contacting surface and thereby insures sufficient conducting area at all times to prevent any disturbing influence due to the possible occurrence of non-conducting spots occasioned by the presence of oil or the like on the rollers or the electrode material.

In Figs. 11 and 12 I have shown a novel form of combined hand-operated and automatic feed device including a casing 150 provided with a handle 151. Within the casing is a feed roller or other feed device 152 mounted upon shaft 153 connected by flexible or universal joints 154, 155, and telescopic shaft section 156 to a shaft 157 arranged to be driven by one of the forms of automatic devices hereinbefore described and which is indicated generically at 158. An adjustable spring pressed pressure roller 159 may be arranged to co-operate with the driving device 152, and additional guide rollers 160, 161, one of which may be spring-pressed, as shown, may be employed to provide contact and driving engagement with the electrode material 162. A suitable conductor 163 is arranged to convey a current to the feed rollers in any usual or desired manner, and a control circuit is connected to conductors 164, which conductors are connected to a switch 165 adapted to be actuated by a trigger 166.

It will be noted that the hand-supported electrode holder is adapted to have considerable freedom of movement, owing to the provision of the joined and telescopic connection to the automatic driving device thus permitting the operator to position the electrode with reference to the work and to move it about as the welding operation progresses. The hand control thus affords a sort of rough adjustment while the finer adjustment is taken care of by the automatic device. The operator is thus relieved if the portion of the work which ordinarily requires the closest attention and the highest degree of skill, namely, the maintainance of the proper length of arc. This device will be of especial advantage in welding or analogous operations where the contour of the work is of considerable irregularity or the required movement of the electrode is such as not to be readily produced by mechanical means only.

It will be noted that I have provided an automatic feed wherein are embodied two constantly acting feed devices adapted to apply force tending to move the electrode material in opposite directions, the relative effect of these devices being capable of variation in accordance with changes in the resistance in the arc or the fluctuations in the voltage required therein. The movement of the electrode therefore results from the combination of two forces which may be adjusted to maintain a very accurate balance when the arc is of normal length. Furthermore the device is very sensitive to variations inasmuch as both driving mechanisms are constantly in motion and the parts affected by the variations and the speed or direction of which is subject to change are relatively small and light and their inertia is correspondingly small.

While I have set forth herein in detail certain forms of embodiment of my invention it will be understood that many changes in details of construction may be made without departing from the spirit and scope of the invention.

I claim:

1. Apparatus for supplying electrode material to an electric arc comprising rotary electrode engaging means, constantly rotating driving devices operatively connected to said means one of said devices being operative to rotate said means in one direction and the other in the opposite direction, a friction clutch between each of said devices and said means, and means for varying the relative effect of the clutches.

2. Apparatus for supplying electrode material to an electric arc comprising a rotary electrode feeding device, clutch elements rotatable with said device, two clutch members rotatable in opposite directions and cooperating with said elements to rotate said device in one or the other direction, both of said members constantly exerting driving influence upon said elements and means responsive to conditions in the arc for determining the relative driving effect of the members.

3. Apparatus for supplying electrode material to an electric arc comprising a device engaging the electrode to advance or retract the same, oppositely rotating driving members, clutches connecting each of said members to said device, said clutches arranged to exert constant driving influence upon said device, means for adjusting one of said clutches, and means responsive to condition of the arc for varying the driving influence of the other clutch.

4. Apparatus for supplying electrode material to an electric arc comprising a device engaging the electrode to advance or retract the same, oppositely rotating driving members, clutches connecting each of said members to said device, said clutches arranged to exert constant driving influence upon said device, one of said clutches being operative to advance the electrode and the other to retract it, the driving influence of the latter clutch being constant, and means responsive to conditions in the arc for varying the driving influence of the electrode-advancing clutch.

5. In metallic electrode supplying means for arc welding apparatus, means for advancing the electrode material toward the work piece, means for retracting the electrode material, and control means for said advancing and retracting means arranged to permit the retracting means to operate after the interruption of the arc to prevent contact of the electrode with the work piece while cooling.

6. In electric arc welding apparatus, electrode feeding mechanism comprising a plurality of driven devices, one operative to feed the electrode toward the work and the other operative to retract the electrode, a motor, clutch mechanism between each of said devices and said motor, one clutch being in constant engagement, and means for varying the relative driving effect of the other clutch in response to conditions in the arc.

7. Metallic electrode arc welding apparatus comprising an electrode holder, adapted to be manipulated by the operator and having electrode feeding means therein, an automatic feeding device responsive to conditions in the arc, and extensible and flexible power-transmitting means connecting said device to said feeding means in the holder.

8. In electrode feeding apparatus for arc welding, the combination with feeding means engaging said electrode and adapted to cause its movement in either direction, of two driving means in constant driving relation to said feeding means and operative to actuate the same in opposite directions, power transmitting connections adapted to effect a gradual variation in the relative driving influence exerted by said driving means upon said feeding means, and means responsive to conditions in the arc for controlling said connections.

9. In electrode feeding apparatus for arc welding, the combination with a feeding device engaging said electrode and operable in either direction to advance or retract the electrode, a driving device having a friction clutch constantly operative upon said feeding device and tending to move the same in one direction, a second driving device having a friction clutch tending to move the feeding device in the opposite direction, and means responsive to conditions in the arc for exerting pressure upon said second clutch.

10. Metallic electrode arc welding apparatus comprising an electrode holder adapted to be held and manipulated by the operator and having electrode feeding means therein, an automatic feeding device responsive to conditions in the arc, and flexible power-transmitting means connecting said device to said feeding means in the holder.

11. Metallic electrode arc welding apparatus comprising an electrode holder adapted to be held and manipulated by the operator and having electrode feeding means therein, an automatic feeding device responsive to conditions in the arc, flexible power-transmitting means connecting said device to the feeding means in the holder, and means on said holder for controlling the welding current.

12. In electrode feeding means, the combination with mechanism for advancing and retracting the electrode, of means including a clutch adapted to actuate said mechanism to move the electrode in one direction, means including a clutch adapted to actuate said mechanism to move the electrode in the opposite direction, and means for varying the driving influence of one clutch to render it greater or less than the driving influence of the other clutch without interrupting the exertion of driving influence by the said other clutch.

13. In apparatus for supplying electrode material to an electric arc an electrode engaging device, constant speed driving means, driving connections adapted to transmit movement continuously between said means and said device, and means adapted to maintain constant control of the rate of movement of said device in response to conditions in the arc.

14. Apparatus as set forth in claim 13 including means for actuating the electrode engaging device in either direction and the control means being adapted to control both the direction and the rate of movement of the device.

15. In apparatus of the class described, the combination of an electric circuit including a portion in which occur variations in current conditions, a control element, constantly rotating means adapted to actuate said element continuously, and means adapted to maintain constant control of the rate of actuation of said element by said actuating means in response to said variations.

16. Apparatus as set forth in claim 15 including means for actuating said element in either of two directions, said control means being adapted to control both the direction and rate of movement of the said element.

17. Apparatus for supplying electrode material to an electric arc comprising a rotary feeding device, a constantly rotating driving means, driving connections between said means and said device adapted to actuate said device constantly at any speed from zero up to the maximum desired, and means responsive to conditions in the arc adapted to vary the speed transmitted through said connections gradually in accordance with the change in such conditions.

18. Apparatus for supplying electrode material to an electric arc comprising a rotary feeding device, a constantly rotating driving means, and driving connections between said means and said device adapted to actuate said device in either direction at any speed from zero up to the maximum desired, and means responsive to conditions in the arc adapted to vary the speed transmitted through said connections gradually through the zero position in either direction.

19. Apparatus for supplying electrode material to an electric arc comprising an electrode feeding device, a driving means adapted to actuate said device in one direction, a second driving means adapted to actuate said device in the opposite direction, driving connections between said two driving means and said device adapted to cause a balance of the forces transmitted by said means or to permit actuation by either means at any speed from zero up to the maximum desired, and means responsive to conditions in the arc adapted to control said connections and to vary the speed of said device gradually throughout the range in either direction.

20. Apparatus for supplying electrode material to an electric arc comprising an electrode feeding device, means adapted to actuate said device in one direction, means adapted to actuate said device in the other direction and means responsive to conditions in the arc adapted to balance the influence of said two actuating means to cause thereby the movement of said device at any speed in either direction within the maximum limits.

21. Apparatus for supplying fusible electrode material to a welding arc formed between said material and a workpiece comprising an electrode engaging and feeding device, constantly rotating means adapted to actuate said device in either direction, and means for exerting constant control upon the direction and rate of movement of said device in response to variations in the arc, said control means being adapted to cause, first, the advance of the electrode material to contact with the workpiece, next, the retraction of the material to draw the arc, and thereafter the continuous adjustment of the electrode forward and backward as determined by the conditions in the arc.

22. The combination with an element to be actuated of means for actuating said element in one direction, means for actuating the element in another direction, clutches providing constant driving connections between each of said actuating means and said element, and means for controlling the clutches to vary their relative driving influence and to determine thereby the rate and direction of movement of said element.

23. In an automatic electric welding machine, means for feeding an electrode controlled by the potential across the welding arc, said means comprising a constant-speed source of power, a variable-speed-electrode-feed drive, and an automatic device for regulating the speed of the feeding means.

24. A welding system comprising a fusible electrode, means for providing non-positive feeding thereof, a brake adapted to bear upon said electrode, and means for varying the pressure of said brake.

25. A welding system comprising a fusible electrode, means for providing non-positive feeding thereof at an excessive feeding rate, and a solenoid actuated brake adapted to variably retard the speed of said electrode.

26. A welding system comprising a fusible electrode, means for providing non-positive feeding thereof, a brake adapted to retard the speed of said electrode and means responsive to variations in the welding arc for controlling the pressure of said brake.

27. In metallic electrode arc welding apparatus, an electrode holder adapted to be held and moved about over the work by the operator, automatic mechanism remote from the holder adapted to control the feed of the electrode, and connections between said feeding mechanism and said holder adapted to maintain feed of the electrode through said holder in accordance with the operation of said mechanism.

28. In metallic electrode arc welding apparatus, electrode actuating mechanism adapted to be located at a distance from the work, said mechanism including rotary actuating members and control devices therefore responsive to conditions in the arc, an electrode holder movable relatively to said mechanism, means on said holder for guiding electrode material therethrough and flexible connections between said holder and said mechanism.

29. In metallic electrode arc welding apparatus, a holder for electrode material including means for guiding electrode material therethrough, automatic electrode actuating means remote from said holder, and connections between said actuating means and said holder permitting the holder to be moved about over the work relatively to the actuating means but maintaining control of the feed of the electrode by said actuating means.

30. In metallic electrode arc welding apparatus, an electrode holder adapted to be held and moved about over the work by the operator, a rotary device adapted to feed electrode material continuously through said holder, and means responsive to conditions in the arc for rotating said device.

31. An electric welding mechanism comprising a fusible electrode, a constant-speed motor, feeding means for said electrode, power-transmitting connections between said motor and said feeding means, and means for continuously varying the action of said connections as the length of the arc varies to maintain thereby a substantially constant arc.

32. In metallic electrode arc welding apparatus, an electrode holder adapted to be held and moved about over the work by the operator, a rotary device adapted to feed electrode material continuously through said holder, means responsive to conditions at the arc for operating said feeding device, a circuit extending to said electrode holder, and a switch upon said holder for controlling said circuit.

33. In metallic electrode arc welding apparatus, an electrode holder adapted to be held and moved about over the work by the operator, a rotary device adapted to feed electrode material continuously through said holder, current operated means for operating said feeding device, a circuit extending to said electrode holder, and a switch upon said holder for controlling said circuit.

34. A welding system comprising a fusible electrode, means tending to feed said electrode continuously in one direction, and means independent of and acting continuously upon said feeding means, and in opposition thereto, to regulate the rate at which said electrode is fed.

35. A welding system comprising a fusible electrode, means tending to feed said electrode continuously in one direction, and current operated means responsive to variations in the welding arc and acting continuously upon said feeding means and in opposition thereto, to regulate the rate at which said electrode is fed.

In testimony whereof I affix my signature.

ELVIN S. GOODSPEED.